United States Patent
Haslauer et al.

(10) Patent No.: US 11,570,506 B2
(45) Date of Patent: Jan. 31, 2023

(54) METHOD FOR SYNCHRONIZING AN ADDITIONAL SIGNAL TO A PRIMARY SIGNAL

(71) Applicant: NativeWaves GmbH, Himmelreich/Salzburg (AT)

(72) Inventors: Christof Haslauer, Eugendorf (AT); Oliver Dumböck, Salzburg (AT)

(73) Assignee: NativeWaves GmbH, Himmelreich/Salzburg (AT)

( * ) Notice: Subject to any disclaimer, the term of this patent is extended or adjusted under 35 U.S.C. 154(b) by 0 days.

(21) Appl. No.: 16/955,966

(22) PCT Filed: Dec. 19, 2018

(86) PCT No.: PCT/EP2018/085831
§ 371 (c)(1),
(2) Date: Jun. 19, 2020

(87) PCT Pub. No.: WO2019/121904
PCT Pub. Date: Jun. 27, 2019

(65) Prior Publication Data
US 2020/0322671 A1    Oct. 8, 2020

(30) Foreign Application Priority Data

Dec. 22, 2017  (DE) ................... 10 2017 131 266.8
Mar. 2, 2018    (AT) ................... A 50180/2018

(51) Int. Cl.
*H04N 21/43*    (2011.01)
*H04N 21/44*    (2011.01)
(Continued)

(52) U.S. Cl.
CPC ....... *H04N 21/43074* (2020.08); *G06F 16/27* (2019.01); *H04N 21/4223* (2013.01);
(Continued)

(58) Field of Classification Search
CPC ......... H04N 21/4307; H04N 21/42203; H04N 21/4223; H04N 21/44008; H04N 21/4621; H04N 21/43079; G06F 16/27
See application file for complete search history.

(56) References Cited

U.S. PATENT DOCUMENTS 6,990,453 B2 * 1/2006 Wang ................. G06F 16/683
                                                                704/E15.045
9,609,034 B2    3/2017 Ramaswamy et al.
(Continued)

FOREIGN PATENT DOCUMENTS

CA    2739104 A1 * 11/2011 ............. H04B 17/21
EP    1030278 A1    8/2000
(Continued)

OTHER PUBLICATIONS

Anonymous, "Accurately synchronizing companion devices with TV programs" Internet Citation, Jan. 10, 2012 (Jan. 10, 2012), pp. 1-2, Retrieved from the Internet: http://www.civolution.com/fileadmin/bestanden/datasheets/VideoSync_-2nd_screen.pdf [retrieved on Jan. 10, 2012] XP007920064.
(Continued)

*Primary Examiner* — Robert J Hance
(74) *Attorney, Agent, or Firm* — HoustonHogle LLP

(57) ABSTRACT

The present invention relates to a method for synchronizing an additional signal to a primary signal. Synchronization information for a primary signal is generated by extracting at least one signal feature sequence of the primary signal and comparing it to DB feature sequences stored in a database. If the signal feature sequence matches one of the DB feature sequences to a predetermined degree, then synchronization information of the matching DB feature sequences is allocated to the primary signal at a position specified by the signal feature sequence. The synchronization information is
(Continued)

Figure 1:
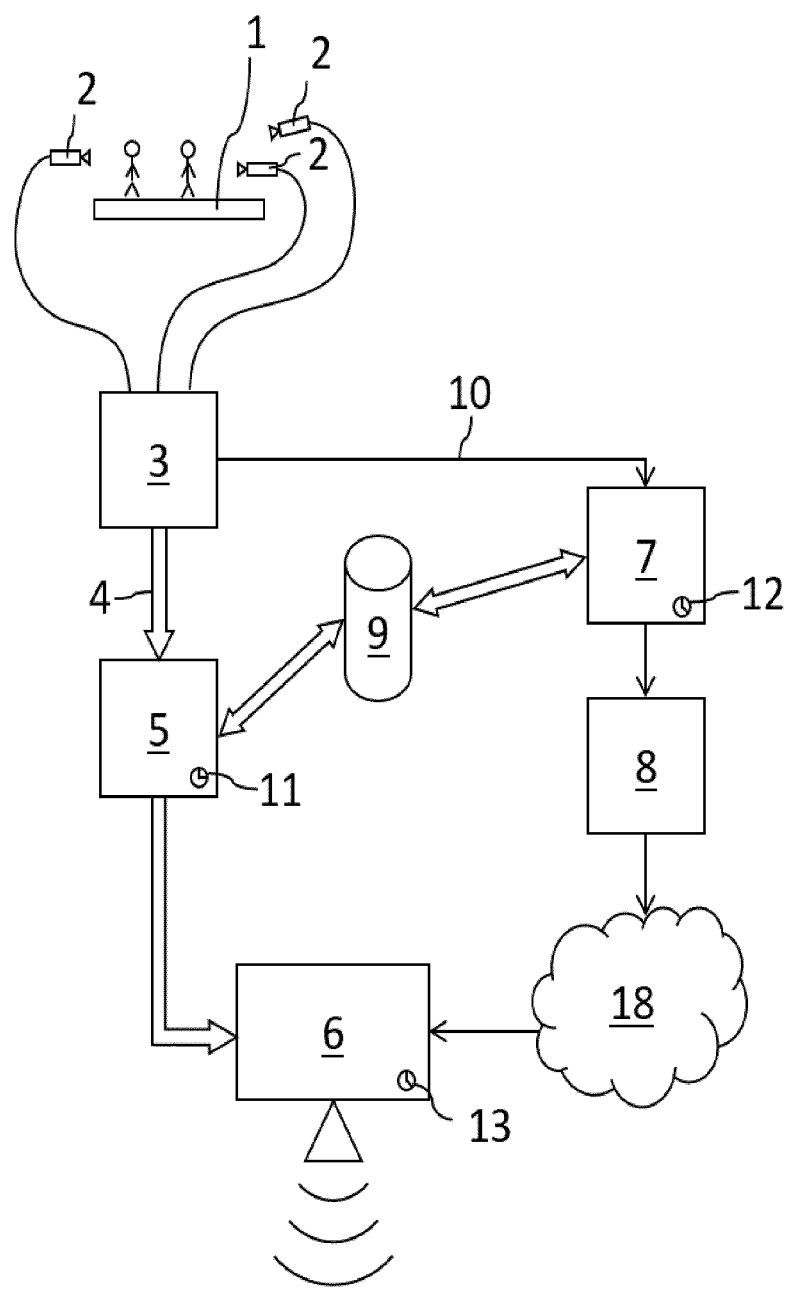

transmitted to a playback device, which outputs an additional signal to the primary signal based on the synchronization information.

17 Claims, 4 Drawing Sheets

(51) Int. Cl.
    *G06F 16/27*     (2019.01)
    *H04N 21/422*     (2011.01)
    *H04N 21/4223*     (2011.01)
    *H04N 21/462*     (2011.01)

(52) U.S. Cl.
    CPC . *H04N 21/42203* (2013.01); *H04N 21/44008* (2013.01); *H04N 21/4621* (2013.01)

(56) References Cited

U.S. PATENT DOCUMENTS

| | | | |
|---|---|---|---|
| 2004/0114919 A1 | 6/2004 | Rife | |
| 2006/0095942 A1* | 5/2006 | van Beek | H04N 19/149 |
| | | | 375/E7.129 |
| 2009/0300204 A1* | 12/2009 | Zhang | H04N 21/44004 |
| | | | 709/231 |
| 2011/0135283 A1 | 6/2011 | Poniatowki et al. | |
| 2011/0137976 A1 | 6/2011 | Poniatowski et al. | |
| 2011/0286735 A1 | 11/2011 | Tremblay | |
| 2014/0201769 A1 | 7/2014 | Neumeier et al. | |
| 2014/0360343 A1* | 12/2014 | Wang | G10L 25/48 |
| | | | 84/634 |
| 2015/0189347 A1 | 7/2015 | Oztaskent et al. | |
| 2016/0227241 A1* | 8/2016 | Franche | H04N 19/40 |
| 2017/0181113 A1* | 6/2017 | Keyser-Allen | H04R 27/00 |

FOREIGN PATENT DOCUMENTS

| | | | | |
|---|---|---|---|---|
| EP | 1 307 833 B1 | | 6/2006 | |
| EP | 1729173 A2 | | 12/2006 | |
| EP | 2 507 790 B1 | | 1/2014 | |
| JP | 2016219979 A | * | 12/2016 | |
| KR | 20120063798 A | | 6/2012 | |
| KR | 20120063798 A | * | 6/2012 | |
| RU | 2566808 C2 | | 10/2015 | |
| WO | WO-0237850 A2 | * | 5/2002 | ..... H04N 21/234327 |
| WO | WO 03003743 A2 | | 1/2003 | |
| WO | WO 2007072326 A2 | | 6/2007 | |
| WO | WO 2011069035 A1 | | 6/2011 | |
| WO | WO 2012049223 A2 | | 4/2012 | |
| WO | WO 2014018652 A2 | | 1/2014 | |
| WO | WO 2014178796 A1 | | 11/2014 | |
| WO | WO 2014209179 A1 | | 12/2014 | |
| WO | WO 2016085414 A1 | | 6/2016 | |
| WO | WO 2017181852 A1 | | 10/2017 | |

OTHER PUBLICATIONS

Written Opinion of the International Searching Authority, dated Feb. 15, 2019, from International Application No. PCT/EP2018/085531, filed on Dec. 19, 2018. 9 pages.

International Search Report of the International Searching Authority, dated Feb. 15, 2019, from International Application No. PCT/EP2018/085531, filed on Dec. 19, 2018. 7 pages.

International Preliminary Report on Patentability, dated Jul. 2, 2020, from International Application No. PCT/EP2018/085531, filed on Dec. 19, 2018. 21 pages.

Communication under Article 94(3) EPC dated Feb. 23, 2021 for European Patent Application No. 18825684.6 filed Dec. 19, 2018. 10 pages.

Brandenburg, K., "MP3 and AAC Explained," Fraunhofer Institute for Integrated Circuits FhG-11S A, 1-12 (1999).

Noll, P., "MPEG Digital Audio Coding," IEEE Signal Processing Magazine, 59-81 (1997).

Salomon, D., "Data Compression The Complete Reference," Springer Science + Business Media, LLC, 821-847 (2007).

Khalifeh, A.F., et al., "Perceptual Evaluation of Audio Quality Under Lossy Networks" IEEE WiSPNET 2017 Conference, 1-5 (2017).

* cited by examiner

METHOD FOR SYNCHRONIZING AN ADDITIONAL SIGNAL TO A PRIMARY SIGNAL

RELATED APPLICATIONS

This application is a § 371 National Phase Application of International Application No. PCT/EP2018/085831, filed on Dec. 19, 2018, now International Publication No. WO 2019/121904, published on Jun. 27, 2019, which International Application claims priority to Austrian Application A50180/2018 filed Mar. 2, 2018 and German Application 10 2017 131 266.8 filed Dec. 22, 2017, all of which are incorporated herein by reference in their entirety.

The invention relates to a method for synchronizing an additional signal to a primary signal and a device for synchronizing an additional signal to a primary signal.

The signals are "continuous signals;" continuous signals are understood to be signals that can be described by a feature sequence of chronologically consecutive features. Typical continuous signals are audio signals and video signals, which can be sampled at regular intervals in order to generate corresponding features. Continuous signals, however, can also be signals that are used to transmit digitally encoded text.

U.S. Pat. No. 9,609,034 B2 has disclosed a method for identifying media data by means of metadata.

WO 2016/085414 A1 describes a method in which a mobile platform recognizes the station on a television and during commercial breaks, receives information that is appropriate to it.

EP 2 507 790 B1 describes a method and system for channel-invariant robust audio hashing with a subsequent comparison of two audio hashes. The audio signals are first divided into fragments with a typical length of 2 seconds. Then these fragments are divided further into frames with a typical length of 0.36 seconds. The frames are Fourier transformed and the resulting data are then normalized. The hash values are obtained by quantizing these data.

WO 2012/049223 A2 describes a method for synchronizing an alternative audio signal to a combined video and audio signal. Two possibilities for this are mentioned. First, a watermark method is described, which for the video and audio signal, constitutes an additional signal that is not perceptible to humans and can, for example, be described as a modulation of the primary audio signal. The other method describes the fingerprint method.

The main audio signal is characterized based on the amplitude, frequency, zero crossing rate, tempo, spectral flatness, bandwidth, and/or audio fingerprints and is compared to the corresponding characteristics of the second signal. If the position in the second signal is detected, then this can be chronologically adapted to the primary signal.

Like WO 2012/049223 A2, WO 2014/018652 A2 describes a method for synchronizing an alternative audio signal to a combined video and audio signal. Once again, a fingerprint process is used as the method. In this case, the fingerprints of the main audio signal are coupled in their entirety to the second signal. The second signal and the fingerprints of the first signal are loaded in advance onto the device that is to be synchronized so that during the synchronization, only the first signal has to be analyzed and compared to the fingerprints on the device.

WO 03003743 A2 has disclosed a method and device that supply synchronization signals for synchronizing parallel media. A synchronization server is coupled to a communication network and connected to a broadcast media start time database. The synchronization server receives a synchronization request from a user client via the communications network. The synchronization server generates synchronization data using the synchronization request and the broadcast media start time database.

WO 2014209179 A1 describes a method and transceiver for network diversity in long distance communications. The method in a main node comprises the following steps for communication with a destination node over long distances:
Synchronizing the use of at least one communications resource with an auxiliary node,
Generating a main signal and an auxiliary signal from an information quantity,
Transmitting the main signal to the destination node by the at least one synchronized communications resource,
Transmitting the auxiliary signal to the auxiliary node by the at least one synchronized communications resource.

The object of the present invention is to provide a quick, robust, and precise method and corresponding device with which an additional signal can be output synchronously to an arbitrary, even continuous, primary signal.

Another object lies in providing a streaming method with a short latency.

Another object lies in providing a quick, robust, and precise method with which the delay between the reception and output of a media playback device can be measured and calibrated.

Another object lies in providing a method for synchronizing an additional signal to a primary signal, which measures the time delay between these two signals and adapts at least one of these signals such that the time delay is as small as possible.

The objects are attained by the features of the independent claims. Advantageous modifications and preferred embodiments are the subject of the dependent claims.

According to a first aspect of the invention, a method for synchronizing an additional signal to a primary signal is provided with the following steps:
Generation of synchronization information for a primary signal by extracting at least one signal feature sequence of the primary signal and comparing it to DB feature sequences stored in a database; if the signal feature sequence matches one of the DB feature sequences to a predetermined degree, then synchronization information of the matching DB feature sequences is allocated to the primary signal at a position specified by the signal feature sequence and
Transmission of the synchronization information to a playback device, which outputs an additional signal synchronously to the primary signal based on the synchronization information.

Since with this method, one or more signal feature sequences of the primary signal are extracted and these are compared to corresponding previously stored DB feature sequences of a database, it is not necessary for the primary signal to inherently be provided with a particular piece of time information such as a starting point. For example, the primary signal can be a continuously transmitted television signal that does not have a starting point. By comparing the feature sequences, one of the signal feature sequences in the primary signal can be identified by matching it with a corresponding DB feature sequence. By means of this, synchronization information can be allocated to the primary signal at a specified position that relates to the identified signal feature sequence. In other words, this means that the synchronization information relate to the location or position of the identified signal feature sequence in the primary signal. This synchronization information is stored, for example, together with the DB feature sequences in the database. This synchronization information, however, can also include a time, in particular a server time of a synchronization server on which this method is carried out, which is detected for example if the additional signal with this signal feature sequence is received from the synchronization server, the signal feature sequence is extracted, or the additional signal with this signal feature sequence is transmitted from the synchronization server to the playback device. This signal feature sequence therefore constitutes a particular location in the primary signal to which a particular time, in particular the server time, is then allocated. This particular time can also be extracted from time information contained within the signal and can be allocated to the respective signal feature sequence.

Naturally, this method can also be used with a primary signal that has a particular starting point. This makes the method according to the invention significantly more flexible than conventional methods of the kind that are known, for example, from EP 1 307 833 B1, which require a primary signal with a fixed time reference. In the method according to the invention, this time reference is generated during the passage of the primary signal (English: on the fly) for example through a synchronization server in that the comparison to the DB feature sequences is used to identify at least one signal feature sequence of the primary signal to which corresponding synchronization information can then be allocated.

In addition, it is possible to determine the time of the signal feature sequence in the primary signal that matches the DB feature sequence and this time can be allocated to this extracted signal feature sequence as an extraction time in order to generate the synchronization information.

With such an extraction time, time information allocated to the primary signal is generated, which connects a location or point in the primary signal to a time. Such an allocation of time information to the primary signal can also make sense if the primary signal already includes time information, e.g. in the form of time markers. If need be, this is used to generate a second reference, which can be connected to further information.

In addition, the DB feature sequence can be allocated time information, which defines a particular DB time relative to the DB feature sequence that is used to generate the synchronization information. This time information is typically stored together with the DB feature sequence in the database. For example, it indicates a particular time when a signal feature sequence, which matches this DB feature sequence, occurs at a particular point in a larger signal segment such as a film. The additional signals can then be synchronized relative to this DB time on the playback device.

Synchronization information can also be allocated to the additional signal by extracting a signal feature sequence of the additional signal and comparing it to a DB feature sequence stored in a database; if the signal feature sequence matches one of the DB feature sequences to a predetermined degree, then synchronization information is allocated to the additional signal at a position specified by the signal feature sequence.

Synchronization information can also be allocated to the additional signal manually. For example, an operator can allocate to the additional signal time information as to when it is to be broadcast relative to a primary signal.

It is also possible, however, to use an additional signal to which synchronization information has already been allocated in advance.

The synchronization information can comprise one or more of the following pieces of data:

Time information, which identifies a time of the primary and/or additional signal; in particular, this describes a time relative to a detected signal feature sequence.

One or more identification markers, which describe the content of the primary and/or additional signal. These identification markers can, for example, describe just the type of the additional signal—such as subtitles in a particular language, audio synchronization signals in a particular language, or an explanation of the type of META information—that are transmitted along with the additional signal. The identification markers, however, can also describe the additional signal in greater detail and reflect structures of the additional signal. For example, if the additional signal is song lyrics, then the identification markers can identify the respective verses of the song lyrics. It is also possible, however, for the identification markers to describe other structures such as chapters, acts of an opera, songs of a concert, episodes of a television series, or the like.

A time stamp, which describes a particular time in the primary and/or additional signal. This time is independent of one of the detected signal feature sequences and for example describes a particular point in a film in relation to a reference point that does not relate to a detected signal feature sequences. This reference point is generally a starting point of the primary signal, of the additional signal, or of a particular segment of the corresponding signal.

A time offset, which describes the time interval required to relay a primary and/or additional signal from a particular point of a transmission path to the actual output of the primary and/or additional signal on the playback device. This synchronization information therefore does not constitute synchronization information that describes a property of the primary and/or additional signal, but rather a property of the device with which the method is carried out.

The synchronization information can be composed very differently depending on the application.

With the aspect of the invention explained above, the synchronization information of the matching DB feature sequences is allocated to the primary signal at a position specified by the signal feature sequence. Particular information in the database is allocated to the DB feature sequences. But this information does not absolutely have to include time information. It can, for example, be metadata, which describe the meaning (e.g. the title of a piece of music, act of an opera, etc.) of the DB feature sequence or of a segment of the signal in which this DB feature sequence is found. The synchronization information can then be generated for example based on time information contained within the primary signal, which is extracted together with the signal feature sequence, or based on the extraction time, which times are for example combined with this meta-information, thus yielding synchronization information based on which an additional signal can be allocated with the same meta-information; the time of the allocation and synchronization is derived based on the extracted time information or based on the extraction time.

In other words, this means that synchronization information is allocated to the primary signal and there is a time relationship of the synchronization information to the primary signal.

The invention is also based on the discovery that media signals from different signal sources often have similar segments of features. These feature segments do not have to be exactly the same. For example, if a primary signal is a high-quality audio signal of a concert and an additional signal is a video signal with a low-quality audio signal, then based on the low-quality audio signal, e.g. when the musicians are greeted with applause, the additional signal can be synchronized very exactly since the audio features here are very similar, even if the quality of the two audio signals differs significantly. This is likewise possible with video signals that have been recorded with professional cameras and those that have been recorded with a mobile phone, for example.

The inventors have discovered that based on these feature segments, it is possible to carry out an automatic identification of one or more particular signal feature sequences in order to synchronize different signals.

The synchronization information can be generated in a synchronization server, which is embodied independently of a playback device. This synchronization information must then be transmitted to the playback device on which the additional signal is output synchronously to the primary signal. In this case, a synchronization of the playback device and the synchronization server could also be performed, for example by determining a time interval that is required to transmit the corresponding signal from a predetermined point, in particular from the synchronization server, to the playback device. The synchronization server, however, can also be embodied in the playback device itself. If a digital transmission of data between the synchronization server and the playback device is used, then it is generally not possible to determine this time interval because it varies.

In the playback device, the additional signal can be synchronized to the primary signal by outputting the primary signal and the additional signal—which each contain one or more time markers as synchronization information—on the playback device. Based on the time markers, the playback device can synchronously allocate the additional signal to the primary signal and can output them synchronously.

In addition, based on a playback time measured in the playback device by means of a clock, the synchronization information can be used in the playback device to allocate the additional signal to this playback time in such a way that the additional signal is output synchronously to the primary signal.

In the first case, the primary signal and the additional signal are output with the same playback device so that the time markers in the two signals are sufficient in order to output the signals synchronously. But if it is desirable to not insert any time markers into the primary signal, for example because of a desire to transmit the primary signal to a playback device as quickly as possible and without any time lag, or if the primary signal is output on a different playback device than the additional signal, then it is advantageous for the synchronization information to be used to allocate the additional signal to a playback time that is measured by means of a clock in the playback device. The synchronization information includes the corresponding information for allocating the additional signal to the playback time in such a way that the additional signal is output synchronously to the primary signal.

If the primary signal and the additional signal are output by different playback devices, then it is advantageous to use a first time to which the output of the primary signal is allocated. This time therefore describes the times of the individual features or feature sequences in the primary signal. Basically, this could be accomplished using the clock of the playback device with which the primary signal is output. But if a synchronization server is provided, which is independent of this playback device for the primary signal, then it is also possible to use the clock of the synchronization server, particularly if the primary signal is transmitted continuously from the synchronization server to the playback device. In that case, it is only necessary to supplement the synchronization information with a corresponding time offset that indicates the time interval by which the output of the primary signal on the playback device is delayed relative to the passage on the synchronization server. For the playback device of the additional signal, synchronization information is provided, which describes the relationship of the playback time on the playback device to the server time on the synchronization server. By means of this, it is possible, based on the playback time, to establish a relationship to the server time of the synchronization server since the output of the primary signal is also synchronized to this server time. If both the server time and the playback time are regularly synchronized to an independent time or reference time (e.g. NTP: network time protocol), then the synchronization information does not have to include any information about the relationship of these two times since the two times must be considered identical within the framework of existing levels of measurement precision.

In the comparison of the signal feature sequences to the DB feature sequences, it can turn out that several signal feature sequences match to the predetermined degree. It is then basically possible to use this plurality of signal feature sequences to generate synchronization information. Advantageously, however, the matching of all of the signal feature sequences that meet the predetermined degree of matching within a predetermined time interval is evaluated and the signal feature sequence with the best evaluation is selected for allocating the synchronization information to the primary signal at a position specified by the signal feature sequence. Basically, the goal is to achieve a unique allocation of the synchronization information to the primary signal. With the use of a plurality of signal feature sequences, this is not always guaranteed. The use of the signal feature sequence that best matches a DB feature sequence also achieves the best synchronization.

The predetermined rules for evaluating the degree of matching of the signal feature sequence with the DB feature sequence include one or more of the following rules:

- The larger the number of matching features of a feature sequence is, the better the evaluation is.
- The larger the number of matching features of a feature sequence is in relation to the number of features contained in the feature sequence, the better the evaluation is.
- A classification of the matching of the individual features is performed; the less distance there is between matching features, the better the classification that is assigned to the corresponding matching and this classification is then taken into consideration in the overall evaluation of the matching of a feature sequence.

According to another aspect of the present invention, a method for synchronizing an additional signal to a primary signal is provided, which includes the following steps:

Extraction of signal feature sequences from the primary signal and storage of the signal feature sequences together with time information in a database, Synchronization of an additional signal using this database; in particular, feature sequences extracted from the additional signal are compared to feature sequences stored in the database and/or time information from the additional signal is compared to corresponding time information in the database.

This method can be used to create a database for a primary signal as the primary signal is being transmitted from a broadcast station to a playback device; this database is immediately available for synchronization of an additional signal to this primary signal. It is thus possible to analyze and synchronize a live signal. For this reason, a database created in this way is also referred to as a live database.

The time information can be generated or extracted by means of time information of a clock provided in a corresponding server and/or based on time information contained within the primary signal.

According to another aspect of the present invention, a method is created for synchronizing an additional signal to a primary signal; to calibrate a transmission path from a server to a playback device and/or to calibrate the latency in a playback device for outputting a media signal on the playback device, a reference signal is output, which is simultaneously received by a corresponding sensor; the output reference signal and the reference signal received by the sensor are compared to each other in order to determine the time interval required for relaying the reference signal and/or for actually outputting it to the playback device and this time interval is used as a time offset in order, based on time information relating to the clock of the server and/or of the playback device, to determine an output time at which a signal is output on the media playback device.

This method can be used to automatically calibrate transmission paths or playback devices. The latency in a playback device can differ significantly as a function of whether, for example, an audio signal is output on a hard-wired speaker, on a speaker connected by Bluetooth, or on a subordinate audio system. The time interval required to transmit signals can differ significantly depending on the respective transmission path. This method can be used to calibrate the transmission path and/or the latency of the output device once or several times before or also during the playback of the media signal so that the correct offset with which the signals are output is respectively present.

The reference signal can include an audio signal; in this case, the sensor is a microphone. The reference signal can also include a video signal. In that case, a camera is used as the sensor.

The time interval can be determined by determining the transmission time and the reception time of the reference signal; the time interval is derived from the time difference between these two times. If the transmission time and the reception time of the reference signal are measured at the same location, then the time interval to be determined is half of the time difference between these two times. If the transmission time of the reference signal is measured at the beginning of the transmission path and the reception time of the reference signal is measured directly at the sensor, then the time interval to be determined is this time difference. One or both times can be carried out by comparing an extracted reference feature sequence to one or more previously stored reference feature sequences. This method corresponds to the above-explained method for identifying signal feature sequences based on DB feature sequences. It is thus possible to determine a time using such a comparison of feature sequences. The precision of such a time is limited by the length of the feature in the feature sequence that is used to determine the time. A typical length of such a feature is in the range of ±8 ms.

According to another aspect of the present invention, a method for synchronizing an additional signal to a primary signal is provided in which an additional signal is transmitted from a synchronization server, which is embodied to be independent of a playback device, to the playback device and in the synchronization server, synchronization information is generated, which relates to a server time of the synchronization server that is measured in the synchronization server with a clock provided there; in the playback device, a playback device clock is provided for measuring a playback time, which is synchronized with the server time at least once, and a time drift of the playback time relative to the server time is measured and this time drift is taken into account in the synchronization of the additional signal to the primary signal. The additional signal can be output on the playback device, controlled by the playback time available from the playback device.

The time drift can have different causes. On the one hand, the clock of the playback device is not always able to run at exactly the same speed as the clock of the server or the clocks of different playback devices run at different speeds. On the other hand, the additional signal can have a temporal elongation or compression in comparison to the primary signal so that an additional signal, which is synchronized exactly to the primary signal at a particular time, deviates from the primary signal more as the playback time increases. Such a temporal elongation or compression comes into being, for example, in the conversion of analog signals into digital signals by means of a corresponding analog-to-digital converter. The primary signal and the additional signal or additional signals are at least transmitted via different paths and are therefore converted with different analog-to-digital converters at different locations. Each analog-to-digital converter has a clock generator (clock), which adds time information in the form of time markers to the digital signal. The time of different clock generators can differ slightly. This leads to the fact that even if a primary signal and an additional signal are identical in the analog state, they have slightly different time information in the digital state. If they are played back on a playback device simultaneously, then a time offset between the two signals can arise as the playback time decreases.

The time drift due to clocks or clock generators on different playback devices running at different speeds can be eliminated through a regular comparison to a reference clock (e.g. atomic clock or TMP). In playback devices, the output unit often has its own clock signal and the playback device has a control unit with its own clock. In such a case, it is advantageous if the clock signal of the playback unit is regularly synchronized with the clock of the control unit of the playback device and the clock of the control unit of the playback device is synchronized with the reference clock at regular intervals.

The time drift due to the compression or elongation of signals can be measured. In this context, it is possible to determine the compression or elongation with the extraction of feature sequences. Once the time drift has been determined, the additional signal can then be perpetually played back synchronously to the primary signal without having to perform a new synchronization between the additional signal and the primary signal at regular intervals.

If the signal part of the main signal to which the additional signal is synchronized is available, then a synchronization of the two signals to each other can also be carried out repeatedly without having to take into account a time drift in order to accomplish this. For example, it can be advantageous to convey the primary signal and the additional signal through a shared synchronization server before they are output on the playback device so that the complete primary signal and additional signal are available on the synchronization server and a new synchronization of the additional signal to the primary signal can take place at any time. Then, on the playback device, the primary signal can be output even without the portion that is necessary for the synchronization of the two signals and a new synchronization between the two signals can nevertheless take place on a regular basis.

The time drift can take place through repeated comparison to a reference time in order to calculate a respective time difference; the time drift is determined based on the deviations in the time difference. The greater the intervals between the first and last comparison, the more precisely the time drift can be determined.

According to another aspect of the present invention, a method for synchronizing an additional signal to a primary signal is created; in a first step, the time stamps of the available additional signals are transmitted to a playback device. It is thus possible to calculate the available buffer time. In this connection, the buffer time describes the time that is still available to the additional signal before it has to be played back in order to be synchronous with the primary signal. At the same time, in this first transmission, the available bandwidth is determined. In the second step, the buffer time is used to encode the additional signal, to transmit it from the additional signal server to the playback device, and then to decode the additional signal again. The quality of the additional signal in this case depends on the available buffer time and on the available bit rate. With the same buffer time, a high signal quality can be achieved either by selecting the shortest possible encoding/decoding time, but this results in large data quantities that require correspondingly long transmission times, or by selecting a long encoding/decoding time, which reduces the bit rate and accelerates the transmission. With different buffer times, hardware requirements, and available bandwidths, the encoding/decoding time must be determined again.

In practice, this method can be embodied in such a way that on the server or servers, the signals (primary signal and/or additional signal) are encoded differently, for example with different codecs, so that the signals are available in different qualities. In the playback device, a decision is then made as to which signal is used and retrieved from the server.

In addition, the additional signal is transmitted from the additional signal server to the playback device in chunks with time lengths of 10 frames, which corresponds to about 400 ms, particularly at most 5 frames, which corresponds to about 200 ms, and preferably at most 1 frame, which corresponds to about 40 ms, and in the playback device, the additional signal is received by means of a local web server. By providing the local web server with a direct link via a web socket, the additional signal can be received essentially without delay. A direct connection is a connection that is retained after a transmission event. The local web server is preferably compatible with the transmission protocol (as a rule: http) used by the playback device so that the playback device itself does not have to be modified, except for the fact that the local web server must be added.

This also enables the use of very short chunks. In the conventional transmission process, such chunks cause a significant delay with the repeated establishment of the data connection since the sequential polling behavior and the individual file requests, which each give rise to an overhead, would create a significant delay. Basically, it would be possible to produce a direct connection, which enables the transmission of chunks almost without a delay. But this has the disadvantage that it can be established only between two particular partners and does not enable streaming to multiple recipients.

Instead of a direct connection, the local web server can be embodied so that it requests a plurality of chunks at the same time or in quick succession without having to wait for reception of previously requested chunks. In conventional processes, the chunks are requested individually and an additional chunk is requested only when the previously requested chunk has already been received. By means of this, even very small chunks can be transmitted in quick succession. For example, conventional streaming techniques such as HLS or DASH can be used for this.

It is thus possible to minimize the necessary transmission time and as a result more time is available for the encoding. This can then be carried out at a higher data rate, which increases the quality of the signal.

With this transmission method, the additional signal can generally arrive at the recipient within two to three seconds.

The aspects explained above can be implemented individually or in arbitrary combinations. In the context of the invention, an additional signal can be synchronized to a primary signal. It is also possible, however, to synchronize a plurality of additional signals to a primary signal.

Figure 2:
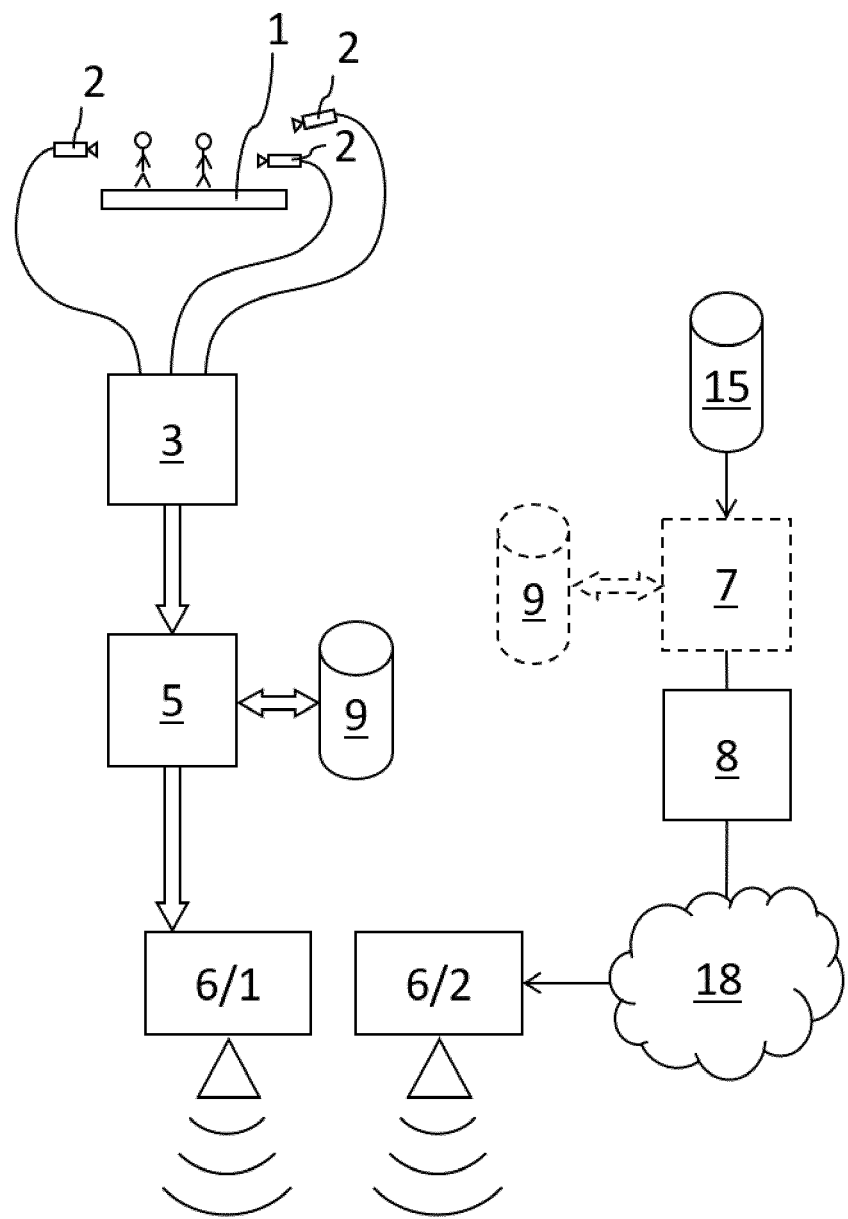
Figure 3:
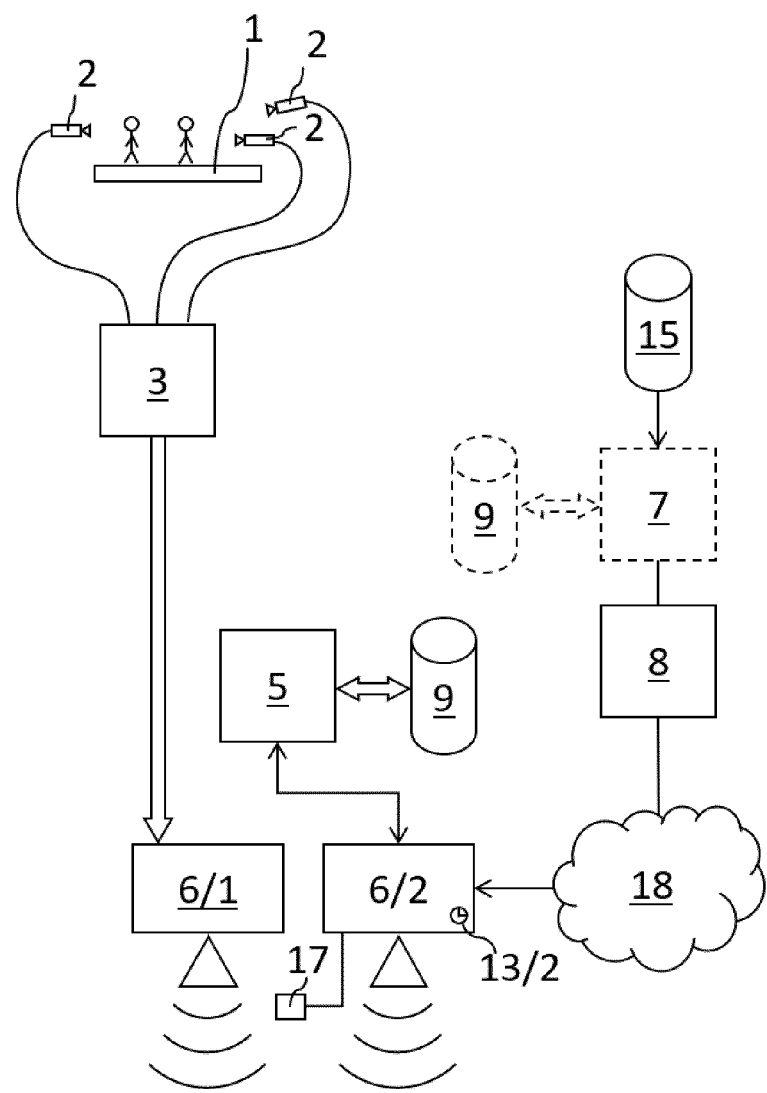
Figure 4:
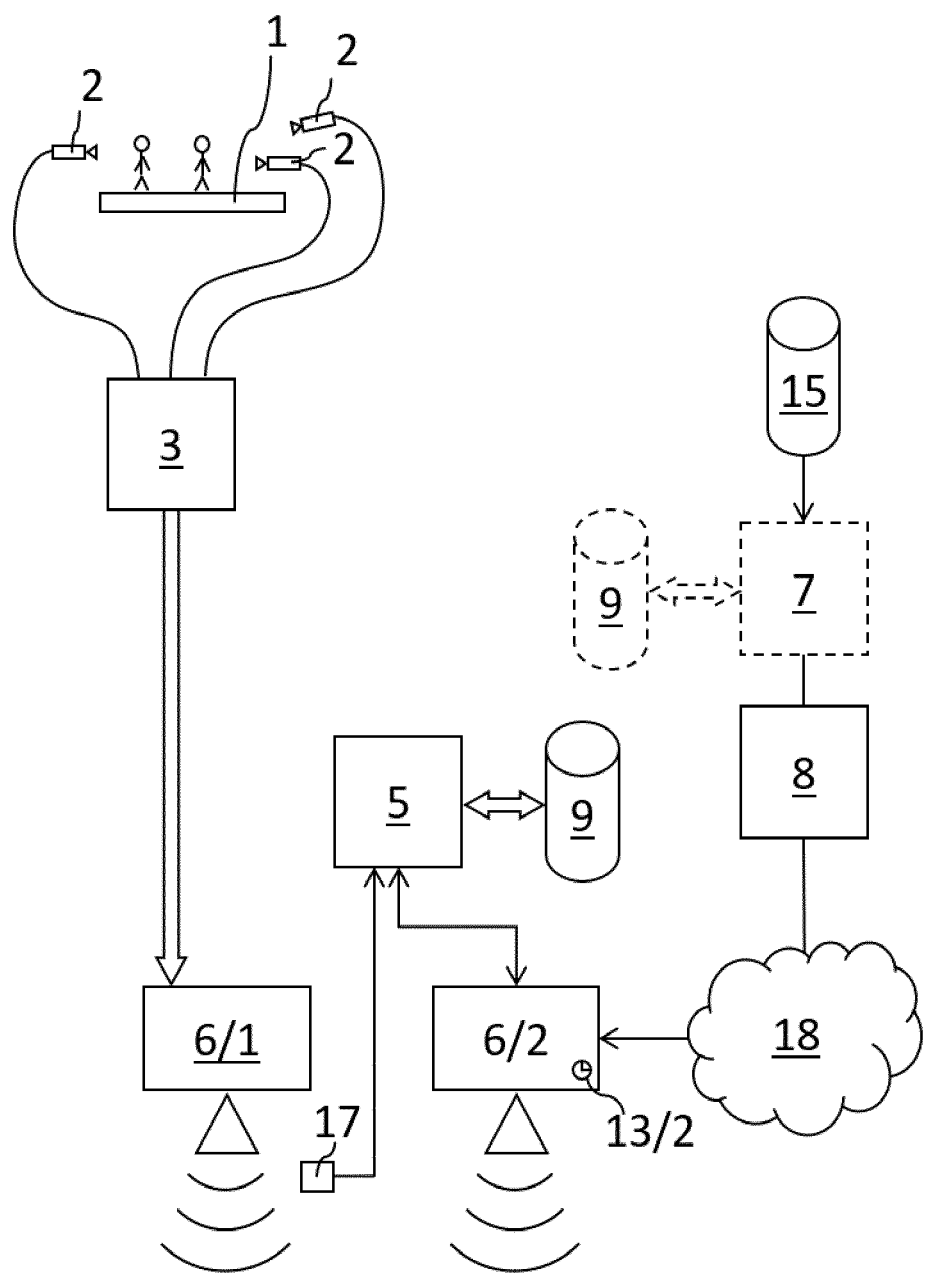

The invention will be explained in greater detail below by way of example based on the drawings. In the drawings:

FIG. 1 shows a system for playing back a plurality of camera signals synchronously to a primary signal, FIG. 2 shows a system for loading external additional information relating to a live broadcast, FIG. 3 shows a system for loading external additional information relating to a television broadcast, FIG. 4 shows a system for loading external additional information relating to a television broadcast with a local server.

A first exemplary embodiment relates to a system for broadcasting a live event on a stage 1 with a plurality of cameras 2 and a broadcast studio 3 in which the camera signals of the individual cameras 2 merge in order to be transformed by the director into a primary signal. The broadcast studio 3 is connected to a synchronization server 5 to which the primary signal 4 is transmitted.

The synchronization server 5 conveys the primary signal 4 as a data stream to one or more playback devices 6. Only a single playback device is shown in FIG. 1. In reality, the primary signal 4 is transmitted to many playback devices, for example in a broadcasting process.

From the broadcast studio, the signals of the individual cameras are conveyed as additional signals to an additional signal synchronization server 7. The additional signal synchronization server 7 is connected to a web server 8 from which the individual additional signals can be retrieved according to an Internet protocol and can be supplied to the respective playback devices 6 via the Internet 18. Between the playback devices and the web server 8, there is a bidirectional data connection so that in the playback devices, an individual selection can be made about the additional signals to be retrieved.

In the broadcast studio, the primary signal is pre-processed and optimized. The individual additional signals are output with or without further pre-processing.

The two synchronization servers 5, 7 are each connected to a database server 9 on which a database is provided, in which particular feature sequences are stored along with synchronization information allocated to the feature sequences. In the present exemplary embodiment, only a single database is provided, which is accessed by both synchronization servers 5, 7. It can also be advantageous, however, to provide a respective copy of the database in the immediate vicinity of each of the synchronization servers 5, 7 to enable rapid access or also to provide two databases with somewhat different data contents.

With this apparatus, the primary signal 4 can be output on the playback device 6 and the user of the playback device should nevertheless also have the possibility of synchronously outputting at least one of the additional signals on the playback device 6.

Both the primary signal 4 and the additional signals each have a video track and an audio track. The audio tracks of the additional signals are each recorded by means of a microphone mounted on the respective camera. The audio signal of the primary signal is recorded by means of a microphone system installed on the stage 1 and is thus of significantly better quality.

In the following, an explanation is given as to how the primary signal and the additional signals are processed in order to enable them to be simply, precisely, and reliably synchronized by the playback device.

In the synchronization server 5, successive segments of a predetermined length are read from the audio track and particular features are extracted from them. To accomplish this, a fast Fourier transformation is carried out to transform these segments into the frequency space or Fourier space. In the present exemplary embodiment, the length of the individual segments is 16 ms. But in any case, they should be no longer than 50 ms and in particular, no longer than 32 ms since short segments permit a correspondingly precise synchronization. The shorter the segments and time slots are, the more pronounced the tendency is for low frequencies to no longer be taken into account. Surprisingly, however, it has turned out that with time slots of up to a maximum length of 8-10 ms, a sufficiently large number of high-frequency signals are available for carrying out the synchronization.

The read and transformed time slots preferably overlap one another. With an overlapping of e.g. 50% and a time slot length of 32 ms or 16 ms, a resolution of 16 ms or 8 ms can be achieved.

In the frequency space, all frequency peaks that lie above a particular threshold are considered to be features. In other words, the features are intensity values of particular frequencies that lie above the predetermined threshold.

These features are detected in the individual time slots and form a feature sequence. In the present exemplary embodiment, the sequence is not a chronological sequence, but rather a listing of features in order of frequency.

The feature sequences derived from the audio track are referred to below as signal feature sequences. These signal feature sequences are compared to DB feature sequences that are stored in the database.

The database 9 contains a multitude of such DB feature sequences that have been stored in advance.

If a pop concert is presented on the stage 1, then a database 9 is used in which all of the songs of the corresponding musical act are converted into DB feature sequences and possibly also songs from other artists that are nevertheless often played live.

The feature sequences are characterized by the fact that—even if the signals from which the DB feature sequences have been generated and the live signals are not identical—they nevertheless have a similarity that allows them to be allocated to each other.

If the comparison of the signal feature sequences to the DB feature sequences determines a matching to a predetermined degree, then this is evaluated to be an allocation.

In the extraction of the respective signal feature sequence, the extraction time is measured by means of the synchronization server clock 11 and is allocated to the respective feature sequence.

This extraction time is used to describe the time of a particular feature sequence in the corresponding signal. The extraction times can thus be used to uniquely describe the relative time allocation of a plurality of signal feature sequences within a signal. It is also possible, however, for the process of the extraction itself to be subject to time fluctuations. In this case, the extraction times are encumbered by an error caused by the time fluctuations. For this reason, it can be advantageous instead of the time measured by the synchronization server clock 11 to use time information contained in the primary signal, which describes the time of a particular point in the primary signal. Such time information is inherently contained in the primary signal and it is referred to below as signal time information. If the primary signal is a video signal, for example, then it has a particular frame rate at which individual frames are recorded and played back. If the frames are counted in sequence, then the time interval between two particular frames of this signal is the number of frames in the signal between these frames multiplied by the inverse of the frame rate. The number of a frame of a video signal therefore constitutes signal time information of this kind. As a rule, such signal time information is explicitly encoded in the primary signal. It can, however, also be implicitly contained, for example in that the number of frames of a video signal are counted.

In the extraction, it is thus possible for the feature sequence to be extracted together with the signal time information that indicates the time of this feature sequence in the primary signal. This yields an extraction time that is independent of the chronological sequence of the process of the extraction.

The signal time information can, for example, be allocated an absolute time by means of the synchronization server clock 11. This allocation is carried out once and is then maintained.

The identified signal feature sequences are allocated synchronization information that is stored together with the corresponding DB feature sequence in the database. In the present exemplary embodiment, the synchronization information includes identification markers, which describe the respective song and define the point in the song. The synchronization information also includes the extraction time of the corresponding signal feature sequences.

On the additional signal synchronization server 7, the same process is carried out with the respective additional signals 10; here, too, the signal feature sequences are extracted from the audio track and compared to the DB feature sequences of the database. The extraction times can be measured using the additional signal synchronization server clock 12 or can be extracted from the corresponding signal time information and the extraction times are transmitted to the playback device together with the synchronization information derived from the database with an allocation to the respective additional signals.

By means of this, time information, which describes the respective time of the extracted feature sequences in the respective signal, is allocated to both the primary signal and the additional signal. This time information can already be synchronized in advance through comparison of the extracted feature sequences to the DB feature sequences stored in the database 9 in that when the extracted feature sequence matches one of the DB feature sequences to a predetermined degree, the synchronization information or time information of this DB feature sequence is allocated to the extracted feature sequence, a time difference is calculated, and this is allocated to the primary signal and to the additional signal; the time difference is added to all of the extraction times of the primary signal and of the additional signal, as a result of which the same synchronization information or the same time information is allocated to the same feature sequences in the primary signal and in the additional signal.

According to a first variant, the synchronization information is coupled to the respective signals. This means that the synchronization information, which is about the primary signal 4 and is generated on the synchronization server 5, is coupled to the primary signal and the synchronization information generated on the additional signal synchronization server 7 is coupled to the corresponding additional signals. The synchronization information is transmitted to the playback device 6 together with the corresponding signals from the respective server 5, 7. Additional signals are transmitted from the web server 8 to the playback device 6 only if the corresponding additional signals have been requested by the playback device 6.

The primary signal 4 and the requested additional signal are then output on the playback device 6. These two signals are synchronized based on the synchronization information transmitted along with them; the synchronization information includes time markers (e.g. the synchronized extraction times) based on which the playback device can recognize when the additional signal is to be output synchronously to the primary signal. In this variant, the corresponding signals are provided with the synchronization information in a kind of watermark.

In this variant, it is advantageous that the synchronization on the playback device is simple since the two signals, i.e. the primary signal and the additional signal, only have to be output synchronously to each other based on their time markers and that no additional transmission paths are necessary in order to transmit the synchronization information between the synchronization servers 5, 7 and the playback device.

In this variant, it is disadvantageous that the primary signal and the additional signal have to be output on a shared playback device and that the primary signal and the additional signal have to be modified by the addition of the synchronization information. This additional information can cause interference in receivers of corresponding signals that do not use this information. The integration of the synchronization information into the signals to be transmitted delays the transmission.

In another variant of this exemplary embodiment, the synchronization information are not coupled to the primary signal and the additional signals, but instead transmitted to the playback device 6 separately. The synchronization information respectively includes time information, which is coupled to a particular identifier of the respective signal. If the signal is a defined segment with a defined beginning, then the time signal can refer to this beginning point or starting point. This can be advantageous particularly with additional signals, which each contain only abbreviated additional information that lasts, for example, from a few tens of seconds up to a few minutes and can be output in addition to the primary signal. Then based on the starting point and the respective time information, the playback device can synchronize the additional signal to the primary signal. If such a starting point is not present in the respective signal, then the time information must refer to another reference point. This reference point can, for example, be a feature sequence in the respective signal. This feature sequence can occur at a different point in the signal. Then the playback device must be provided with a module that can extract the feature sequence from the respective primary signal and/or additional signal and can compare it to the feature sequence that is supplied along with the synchronization information. It is therefore possible, without a uniquely defined starting point in the primary signal or additional signal, to obtain a unique reference of the time information to the respective primary signal and additional signal. In this variant, it is disadvantageous that the playback device must be provided with a module for extracting the feature sequence and for comparing the extracted feature sequence to the feature sequences contained in the synchronization information. It is, however, advantageous that in this variant, the additional signal and/or the primary signal does not have to be modified and can be transmitted in the original form.

According to a third variant of the first exemplary embodiment, a playback device clock 13 provided in the playback device 6, the synchronization server clock 11, and the additional signal synchronization server clock 12 are synchronized. In this case, the playback device clock 13 is respectively synchronized pairwise with the synchronization server clock 11 and the additional signal synchronization server clock 12.

In addition, the transmission times of the primary signal from the synchronization server 5 to the playback device 6 and the transmission time from the additional signal synchronization server 7 to the playback device 6 are known. The transmission paths in this case are embodied in such a way that the transmission times remain constant. With short transmission paths such as Bluetooth links, the transmission times are generally constant. With longer transmission paths, particularly when data are transmitted via the Internet, the transmission times often vary significantly so that in that case, this variant does not work.

The time information contained in the synchronization information relates to a particular event on the synchronization server 5 or on the additional synchronization server 7. This event is typically the time of the extraction of a particular signal feature sequence, which it has been possible to identify based on the DB feature sequences. It is therefore known when the primary signal or the additional signal has been conveyed through to the corresponding synchronization server 5, 7 along with the corresponding signal feature sequence. Since the transmission time from the respective synchronization server 5, 7 to the playback device 6 is also known, this can be used to determine when the signal feature sequences arrive at the playback device 6. Since these signal feature sequences of the primary signal and of the corresponding additional signal have been identified, the additional signal can be timereferenced to the primary signal, i.e. the additional signal can be synchronized with the primary signal. The corresponding time relationship is included in the synchronization information.

In this variant, the playback device clock 13 must be synchronized respectively with the synchronization server clock 11 and with the additional signal synchronization server clock 12 and the transmission times from the individual synchronization servers 5, 7 to the playback device must be known and stable. In this case, however, it is advantageous that neither the primary signal nor the synchronization signal has to be modified. In addition, a module for extracting feature sequences does not have to be integrated into the playback device. This is a very simple solution, which permits reliable synchronization.

Another advantage of the third variant lies in the fact that this third variant can also be simply carried out with two different playback devices; one playback device is provided for playing back the primary signal and a second playback device is provided for playing back the additional signal. A playback device clock of the primary signal playback device must be synchronized with the synchronization server clock 11 of the synchronization server 5 and an additional signal playback device clock must be synchronized with the additional signal synchronization server clock 12. In addition, the two playback device clocks must be synchronized to each other.

For example, the primary signal playback device can be a television and the additional signal playback device can be a mobile phone. The primary signal and the additional signal are output synchronously to each other.

All three of the variants explained above share the fact that a primary signal in the form of a primary signal output by the broadcast studio 3 can be output on the playback device and an additional signal in the form of a signal of a camera 2 can also be output, which does not have to be the camera with which the primary signal is output. A user can therefore freely select the camera with which he wishes to watch the performance on the stage 1. Since all of these signals have a similar audio track, they can be synchronized to one another simply and reliably by means of the audio tracks.

In addition, the variants explained above can be combined with one another, for example by transmitting the additional signal with the playback device according to one of the three variants and transmitting the additional signal according to one of the other variants to the playback device and synchronizing with the additional signal.

Basically the third variant is preferred for the transmission of the primary signal, whereas all three variants are of equal value for the transmission of the additional signals.

A second exemplary embodiment (FIG. 2) will be explained below; elements that are the same as those in the first exemplary embodiment are provided with the same reference numerals. For elements that remain the same, the above explanations apply unless otherwise stated below.

In the second exemplary embodiment, a stage 1 is once again provided, which is scanned by a plurality of cameras 2. The signals of the cameras 2 are transformed into a primary signal 4 in a broadcast studio 3. The broadcast studio 3 is connected to a synchronization server 5. The synchronization server 5 is coupled to a database server 9, which has a database containing DB feature sequences and the associated synchronization information.

A PS playback device 6/1 is connected to the synchronization server 5 in order to receive and playback the primary signal. Once again, a plurality of PS playback devices 6/1 can be provided.

The second exemplary embodiment differs from the first exemplary embodiment in that an independent source for additional information is provided. For example, this source is an additional information database server 15. If a concert with a plurality of songs is given on the stage 1, then it can be advantageous to provide the corresponding song lyrics in the additional information database server 15. But the additional information database server 15 can also contain foreign language translations of the corresponding song lyrics as audio tracks. There are songs that are known in many languages such as the children's lullaby "Frère Jacques."

Preferably, the additional information stored on the additional information database server 15 is already provided with corresponding synchronization information. With songs, this can be the starting time and other time markers during the song.

The additional information database server 15 is connected to a web server 8. The additional information can be retrieved from the web server 8 via the Internet 18. An AS playback device 6/2 for playing back an additional signal is connected to the Internet 14. The synchronization server 5 also has a connection to the Internet 14 so that synchronization information generated on the synchronization server 5 can be supplied to the AS playback device 6/2 via the Internet 14.

In the synchronization server 5 in turn, a synchronization clock 11 is provided, which is respectively synchronized with a playback device clock 13/1 of the PS playback device and with a playback device clock 13/2 of the AS playback device 6/2. In the second exemplary embodiment, the synchronization clock 11 of the synchronization server 5 is the main clock, whereas in the first exemplary embodiment, the playback device clock 13 is the main clock with which all other clocks are synchronized.

On the synchronization server 5, synchronization information is generated by extracting signal feature sequences from the primary signal and comparing them to corresponding DB feature sequences of the database server 9. The generation of the synchronization information corresponds essentially to that of the first exemplary embodiment.

In addition, the transmission time for transmitting the primary signal from the synchronization server 5 to the PS playback device 6/1 is known so that if the time at which when a particular segment of the primary signal is conveyed through the synchronization server 5 is known, then the time at which this segment is output on the PS playback device 6/1 is also known.

The synchronization information that is transmitted from the synchronization server 5 to the AS playback device 6/2 therefore includes time information, which respectively describes a time of the primary signal relative to a detected signal feature sequence, and identification markers, which describe the content of the primary signal. In the present exemplary embodinvent, the identification markers indicate which song is played back with the primary signal.

The identification markers can optionally also include additional information such as the verse, the line, or lyrics excerpts of the song. These lyrics excerpts are preferably lyrics excerpts from the point at which one of the signal feature sequences has been detected. The time information preferably includes an indication of the time at which the corresponding signal feature sequence on the synchronization server 5 was extracted.

Based on this synchronization information, the AS playback device 6/2 knows when each song is output on the PS playback device 6/1. Correspondingly, the AS playback device can output the additional signals—which are received from the additional information database server 15 or from the web server 8 and have already been provided with synchronization information in advance—on the AS playback device 6/2 synchronously to the output of the primary signal on the PS playback device 6/1.

Optionally, between the additional information database server 15 and the web server 8, an additional signal synchronization server 7 can be provided, which is embodied similarly to the one in the first exemplary embodiment. If the additional information is in the form of song lyrics that are encoded in ASCII for example, then the additional information does not include any audio signals. But audio signal-like feature sequences can be generated from the words contained in the song lyrics, as is known from speech synthesis. These feature sequences can then in turn be compared to DB feature sequences, which have been stored in another database server 16. This also makes it possible to compare lyrics segments of songs directly to corresponding lyrics segments stored on the database server 16. In this case, the individual letters of the lyrics segments constitute the corresponding features. The feature sequences stored on the database server 16 are respectively allocated synchronization information, which can be added to the additional information or additional signals.

Alternatively, spoken or sung texts can also be converted into text form through speech recognition. The features are then text and/or letter sequences that are likewise stored in the database.

On the AS playback device 6/2, it is thus possible to display the corresponding song lyrics synchronously to the video and audio playback of the concert taking place on the stage 1, which is output on the PS playback device 6/1.

A third exemplary embodiment (FIG. 3) essentially corresponds to the second exemplary embodiment and differs from it in that the synchronization server 5 is embodied independently of the connection between the broadcast station 3 and the PS playback devices 6/1 for playing back the primary signal. In addition, the AS playback device 6/2 has a sensor 17 for detecting at least a part of the primary signal output by the PS playback device 6/1. This sensor 17 can be a microphone for detecting the audio signal of the primary signal 4 or can be a camera for capturing the video output of the primary signal 4.

The AS playback device 6/2 is embodied with a module for extracting the signal feature sequences of the primary signal 4; these signal feature sequences are extracted from the primary signal 4 that is picked up by the sensor 17. The extraction time can be measured by means of the AS playback device clock 13/2. Since the process of the extraction itself can be subject to time fluctuations as has already been explained above, it can be advantageous to use the signal time information in order to determine the extraction time. In this embodiment, instead of signal time information inherently contained in the primary signal, it is also possible to use signal time information, which is added during the recording with the sensor 17 (microphone) and which describes the recording time of the signal. Such signal time information is independent of time fluctuations of the extraction process and enables a unique relative time positioning of the extracted signal feature sequences.

The signal feature sequences are transmitted to the synchronization server 5 and are analyzed and identified therein based on the DB feature sequences from the database server 9 as in the first and second exemplary embodiments. On the synchronization server 5, synchronization information is in turn generated; the synchronization information of the third exemplary embodiment differs from the synchronization information of the preceding exemplary embodiments in that for it, only the time of the AS playback device clock 13/2 matters. The synchronization information is transmitted from the synchronization server to the AS playback device 6/2 via the Internet 14. There, the additional signal 10 is synchronized to the primary signal 4 based on the synchronization information as it is in the preceding exemplary embodiments; in this case, however, the synchronization is carried out based solely on the playback time measured with the AS playback device clock 13/2. There is no need to synchronize different times between the AS playback device 6/2, the PS playback device 6/1, or the synchronization server 5.

Alternatively, instead of the signal feature sequences, it is also possible for short signal sequences such as music snippets to be transmitted to the synchronization server 5, which are to be output as an additional signal. In this case, the server identifies the signal feature sequences of the signal sequences and analyzes and identifies them based on the DB feature sequences from the database server 9. As a rule, the signal sequences are no longer than 60 s and in particular, no longer than 30 s or no longer than 15 s.

The third exemplary embodiment can also be modified in that a module for extracting the signal feature sequences is provided in the synchronization server 5 instead of in the AS playback device 6/2.

The third exemplary embodiment is a very elegant solution for outputting additional signals to a separate AS playback device 6/2. In this third exemplary embodiment, the additional signal can be synchronized to a primary signal; the transmission time can freely vary within a predetermined scope, for example, between the broadcast station 3 and the PS playback device 6/1.

A fourth exemplary embodiment (FIG. 4) corresponds essentially to the third exemplary embodiment and differs from the latter in that the synchronization server 5 has the sensor 17. The synchronization server 5 is implemented on a local computing unit, e.g. a computer, a minicomputer, or even a game console. As in the preceding exemplary embodiment, the sensor 17 can be a microphone for detecting the audio signal of the primary signal 4 or can be a camera for capturing the video output of the primary signal 4.

The synchronization server 5 is embodied with a module for extracting the signal feature sequences of the primary signal 4; these signal feature sequences are extracted from the primary signal 4 that is picked up by the sensor 17.

The extraction time is measured by means of the synchronization clock 11. The signal feature sequences are analyzed and identified on the synchronization server 5 based on the DB feature sequences from the database server 9, as in the first, second, and third exemplary embodiments. On the synchronization server 5, synchronization information is in turn generated; for the synchronization information, only the time of the synchronization clock 11 matters. The synchronization information is transmitted from the synchronization server 5 to the AS playback device 6/2 via an intranet 14 or another data connection such as Bluetooth. There, the additional signal 10 is synchronized to the primary signal 4 based on the synchronization information, as in the preceding exemplary embodiments. In this case, the time of the synchronization clock 11 is synchronized with the AS playback device clock 13/2.

The main difference between the fourth exemplary embodiment and the preceding ones lies in the fact that the synchronization server 5 is not controlled via the Internet, but is instead provided to a user locally. This has the advantage that even if the Internet is down, the synchronization always works since it is not dependent on the Internet.

The database server 9, however, can be controlled via the Internet or it is likewise provided in the same computing unit as the synchronization server 5.

In the third or fourth exemplary embodiment explained above, the synchronization server 5, the database server 9, and the AS playback device 6/2 can be embodied on a single device such as a computer (desktop, laptop, etc.) or on a mobile phone.

Basically, however, the synchronization server 5 can also be provided on a hardware element that is separate from the playback device 6/2. The synchronization server 5 can be connected to the playback device 6/2 via the Internet. The data quantity exchanged between the synchronization server 5 and the playback device is small.

All of the exemplary embodiments explained above share the fact that synchronization information is generated based on one or more signal feature sequences that are extracted from the primary signal. This makes it possible (on the fly) to synchronize additional signals to a primary signal about which no particular time such as a starting time is known in advance. Naturally, this method can also be used if a previously determined time is indicated in the respective signal and can be used for orientation.

Based on this synchronization information, the synchronization of additional signals to the primary signal can take place in a wide variety of ways. A few examples are explained above. In the context of the invention, however, there are countless possible modifications that could be correspondingly adapted and embodied for the respective use.

Another aspect of the invention is to adjust the quality of the additional signal streaming not only based on the available bandwidth, but also based on the available buffer time. In this case, the additional signal playback device 6/2 receives the synchronization information and sends a query to the additional information database server 14 as to which additional signals are available. If a corresponding additional signal 10 is found, then the buffer time is also known. The buffer time in this connection describes the remaining time that is still available for the additional signal before it must be played back in order to be synchronous with the primary signal. This query can also roughly check the available bandwidth of the network. Depending on the bandwidth and buffer time, another encoding step is automatically selected. During the buffer time, the additional signal is encoded, transmitted from the additional signal server to the playback device, and then decoded again. Depending on the encoding step, the file to be transmitted or the portion of the file is of different length and requires a different amount of time for the transmission. A balance must therefore be struck between the encoding time and the transmission time so that optimal use is made of the buffer time and the quality of the additional signal is as high as possible.

This method can also be carried out so that the server or servers encode the signals in different qualities or in different encoding steps and simultaneously make them available for retrieval and the playback device, which is to play back the signal, selects and retrieves the signal in the suitable quality or encoding step.

If the buffer time is very short, for example during live broadcasts, then it is advantageous if the chunk length of the additional signal to be transmitted is selected to be as short as possible. The signal can be transmitted split into a plurality of chunks; the chunks must first be generated. The shorter the chunks are, the more complex the handling of the chunks because they are transmitted individually. But when retrieving a chunk, it is necessary to wait at least as long as the length of the respective chunk. For this reason, the shorter the chunks are, the quicker a reaction is required. In this context, the chunk length can be reduced until it corresponds to a single frame. At 25 frames per second, this corresponds to 40 ms. Very rapid transmissions are therefore possible. With certain codecs such as the h265 codec, "zero latency" settings are also possible. This means that the time for the encoding and the subsequent decoding again is very short and for example is less than 1 s. A certain amount of latency is unavoidable. But with a "zero latency" setting, the corresponding codec method does not cause any additional latency. The buffer time is thus required almost exclusively for the actual transmission of the signal, which can also be very significantly reduced with a correspondingly higher bandwidth. For example, in a live concert, at which the organizer provides a camera view via a web server to the attendees with smartphones, a corresponding WLAN infrastructure can also be provided so that the video signal can be transmitted almost without delay.

With this aspect, the encoding of the additional signal and/or the transmission path for the transmission of the additional signal to the additional signal playback device 6/2 can thus be automatically selected as a function of the determined synchronization information. If the synchronization information includes an indication that not much time is left for transmitting the additional signal, then it is advantageous to reduce the data amount of the additional signal through a correspondingly compressing encoding and to select a rapid transmission path. The encoding should also occur very rapidly. A sharp reduction of the data amount and a rapid compression often negatively affect the quality of the additional signal. But if more time is available, then a more laborious encoding and/or a low compression rate can be used, which achieves a higher quality of the additional signal.

In all of the exemplary embodiments explained above, a database server 9 is provided with a previously prepared database containing DB feature sequences and synchronization information.

In the context of the invention, the database can also be created on the database server 9 during operation (live database). This is advantageous primarily if there is a primary signal that additional signals should be output synchronously to and the primary signal was not previously known. In such a case, feature sequences are extracted from the primary signal and the time respectively available for the extraction is measured. These extracted feature sequences are stored in the database together with the extraction time. Instead of or in addition to the extraction time, it is also possible for time information contained in the primary signal to be extracted and stored together with the feature sequences in the database server 9.

The time information in this case constitutes all or part of the synchronization information. The database generated in this way during operation of the system can be synchronized with another database in which different signals have already been stored in advance in feature sequences; this database can also contain meta-information, which describes the content, the times, and the meaning of these feature sequences and/or of this signal. A wide variety of media streams can be stored as feature sequences in this database. Through a comparison to this additional database, the feature sequences of the database that is generated "online" or "on the fly" can be allocated meta-information, in particular semantic information or meanings.

Such an online generation of the database on the database server 9 is possible with all of the exemplary embodiments explained above. A user can also locally generate such a live database on site in his user device (computer, mobile phone, etc.).

REFERENCE NUMERAL LIST

| | |
|---|---|
| 1 | stage |
| 2 | camera |
| 3 | broadcast studio |
| 4 | primary signal |
| 5 | synchronization server |
| 6 | playback device |
| 7 | additional signal synchronization server |
| 8 | web server |
| 9 | database server |
| 10 | additional signal |
| 11 | synchronization clock |
| 12 | additional signal synchronization clock |
| 13 | playback device clock |
| 14 | additional information database server |
| 16 | database server |
| 17 | sensor |
| 18 | Internet |

The invention claimed is:

1. A method for synchronizing an additional signal to a primary signal which is transmitted to many playback devices in a broadcasting process, the method including:
   Generation of synchronization information for the primary signal by extracting at least one signal feature sequence of the primary signal and comparing it to DB feature sequences stored in a database, wherein the signal feature sequence and the DB feature sequences comprise features in the frequency space, wherein the primary signal is transformed into the frequency space using a fast Fourier transform of a portion of the primary signal that is not longer than 50 milliseconds and the features are frequency peaks which are above a certain threshold value;
   Detecting that the signal feature sequence matches one of the DB feature sequences to a predetermined degree, and in response to said detecting, synchronization information of the matching DB feature sequences is allocated to the primary signal at a position specified by the signal feature sequence;
   Transmission of the synchronization information to one of the playback devices, which outputs an additional signal synchronously to the primary signal based on the synchronization information; and
   Generation of DB feature sequences for a database from the primary signal while the primary signal is being transmitted from a broadcast station to the playback device, and wherein in a first step, time stamps of the available additional signals are transmitted to a playback device and by means of this, available buffer time is calculated, and in a second step, the additional signal is transmitted from an additional signal server to a playback device; the quality of the additional signal depends on the buffer time and on an available bit rate.

2. The method according to claim 1,
wherein
the time of the signal feature sequence in the primary signal, which matches the DB feature sequence, is determined and this time is used as an extraction time in order to generate the synchronization information.

3. The method according to claim 1,
wherein
the DB feature sequence is allocated time information, which defines a particular DB time relative to the DB feature sequence that is used to generate the synchronization information.

4. The method according to claim 1,
wherein
synchronization information is allocated to the additional signal by extracting a signal feature sequence of the additional signal and comparing it to DB feature sequences stored in a database; if the signal feature sequence matches one of the DB feature sequences to a predetermined degree, then synchronization information is allocated to the additional signal at a position specified by the signal feature sequence or
synchronization information is allocated to the additional signal manually or an additional signal is used to which synchronization information has already been allocated in advance.

5. The method according to claim 1,
wherein
the synchronization information comprises one or more of the following pieces of data:
   Time information, which describes a time of the primary and/or additional signal relative to a detected signal feature sequence,
   One or more identification markers, which describe the content of the primary and/or additional signal,
   A time stamp, which describes a particular time in the primary and/or additional signal,
   A time offset, which describes the time interval required to relay a primary and/or additional signal from a particular point of a transmission path to the actual output of the primary and/or additional signal on the playback device.

6. The method according to claim 1,
wherein
the synchronization information is generated in a synchronization server, which is embodied independently of a playback device.

7. The method according to claim 1,
wherein
in the playback device, the additional signal is synchronized to the primary signal
   in that the primary signal and the additional signal are output on the playback device and each contain one or more time markers as synchronization information based on which the playback device synchronously allocates the additional signal to the primary signal or
   based on a playback time measured in the playback device by means of a clock, to which playback time the additional signal is allocated by means of the synchronization information in such a way that the additional signal is output synchronously to the primary signal.

8. The method according to claim 1,
wherein
if several signal feature sequences match corresponding DB feature sequences to a predetermined degree, then these signal feature sequences are evaluated according to predetermined rules and the signal feature sequence with the best evaluation is selected for allocating the synchronization information to the primary signal at a position specified by the signal feature sequence.

9. The method according to claim 8,
wherein
the predetermined rules include one or more of the following rules:
The larger the number of matching features of a feature sequence is, the better the evaluation is,
The larger the number of matching features of a feature sequence is in relation to the number of features contained in the feature sequence, the better the evaluation is,
A classification of the matching of the individual features is performed; the less distance there is between matching features, the better the classification that is assigned to the corresponding matching and this classification is then taken into consideration in the overall evaluation of the matching of a feature sequence.

10. The method for synchronizing an additional signal to a primary signal according to claim 1,
wherein
to calibrate a transmission path from a server to a playback device and/or to calibrate the latency in a playback device for outputting a media signal on the playback device, a reference signal is output,
which is simultaneously received by a corresponding sensor; the output reference signal and the received reference signal are compared to each other in order to determine a time interval required for relaying the reference signal and/or for actually outputting it to the playback device, and
this time interval is used as a time offset in order to determine an output time at which a signal is output on the media playback device.

11. The method according to claim 10,
wherein the reference signal includes an audio signal and the sensor is a microphone and/or the reference signal includes a video signal and the sensor is a camera.

12. The method according to claim 11,
wherein the time interval is determined by determining the transmission time and the reception time of the reference signal; the time interval is derived from the time difference between these two times and the measurement of at least one of the two times is carried out by comparing an extracted reference signal feature sequence to one or more previously stored reference signal feature sequences.

13. The method for synchronizing an additional signal to a primary signal according to claim 1, wherein
an additional signal is transmitted from a synchronization server, which is embodied to be independent of a playback device, to the playback device and in the synchronization server, synchronization information is generated, which relates to a server time of the synchronization server that is measured in the synchronization server with a clock provided there; in the playback device, a playback device clock is provided for measuring the playback time, which is synchronized with the server time at least once, and
a time drift of the playback time relative to the server time is measured and this time drift is taken into account in the synchronization of the additional signal to the primary signal.

14. The method according to claim 13,
wherein the time drift is determined by multiple transmission of a time signal of the server time to the playback device or multiple transmission of the playback time to the synchronization server and comparison of the transmitted time signal to the locally present time signal in order to calculate a respective time difference; the time drift is determined based on the deviations of the time differences.

15. The method for synchronizing an additional signal to a primary signal according to claim 1, wherein
based on the synchronization information, a determination is made as to how much time is available for transmitting the additional signal from a predetermined server to a playback device and based on this time, either one or more encoding methods are selected or adjusted automatically and/or one or more transmission paths are selected.

16. The method according to claim 1, wherein the additional signal is transmitted from the additional signal server to the playback device in chunks with time lengths of at most 10 frames, which corresponds to about 400 ms, and in the playback device, the additional signal is received by means of a local web server.

17. A method for synchronizing an additional signal to a primary signal, wherein
in a first step, time stamps of available additional signals are transmitted to a playback device and by means of this, the available buffer time is calculated, and in a second step, the additional signal is transmitted from an additional signal server to a playback device; the quality of the additional signal depends on the buffer time and on the available bit rate.

* * * * *